March 6, 1951  L. J. WEBER  2,544,575
PEBBLE FEEDER

Filed June 21, 1948  2 Sheets-Sheet 1

INVENTOR.
L. J. WEBER

BY Hudson and Young

ATTORNEYS

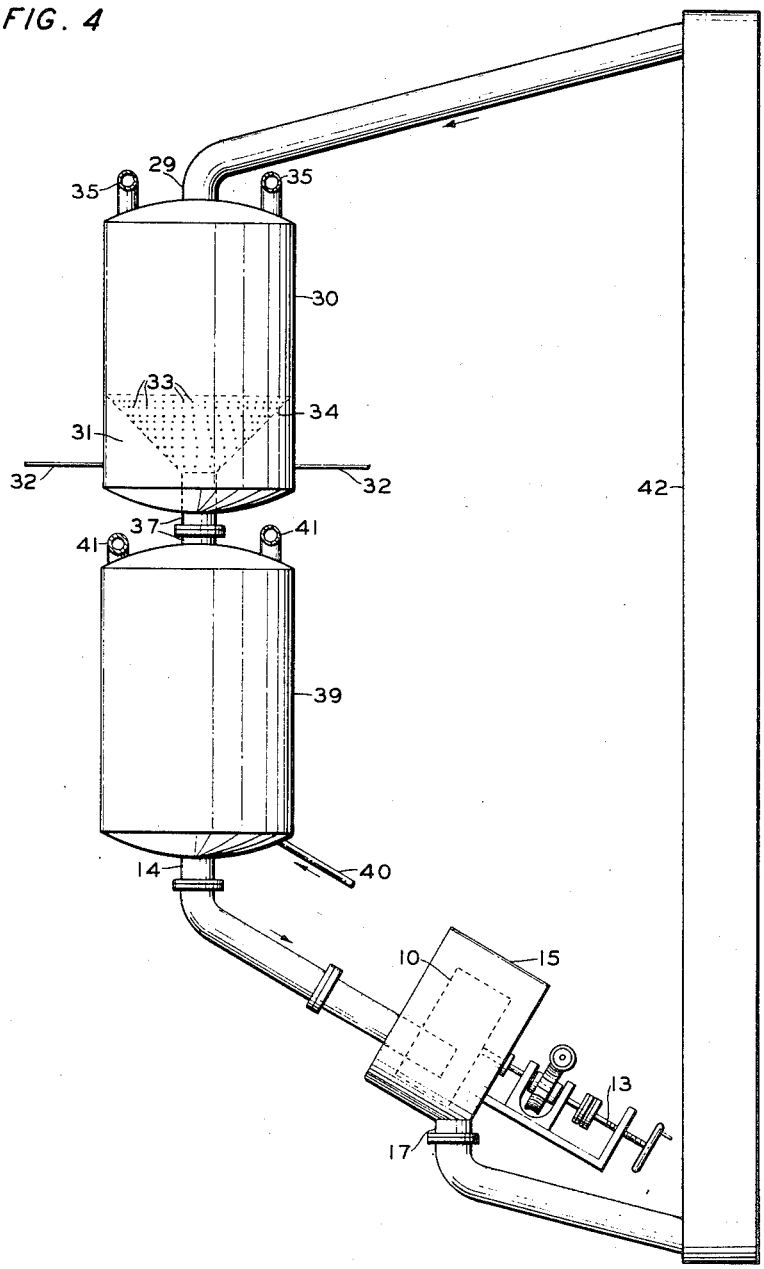

Patented Mar. 6, 1951

2,544,575

UNITED STATES PATENT OFFICE 2,544,575
PEBBLE FEEDER

Louis J. Weber, Bartlesville, Okla., assignor to Phillips Petroleum Company, a corporation of Delaware Application June 21, 1948, Serial No. 34,316

7 Claims. (Cl. 214—35)

This invention relates to the flow of a contiguous mass of solid particulate material. In one aspect this invention relates to apparatus for contacting fluids with a moving contiguous mass of solid particulate material. In another aspect this invention relates to the regulation of flow of pebbles in a pebble heater apparatus. In a more specific aspect this invention relates to pebble feeders.

Apparatus especially applicable in hydrocarbon conversion and heat exchange processes, and which utilizes a moving contiguous mass of solid refractory contact material as a heat exchange medium, is commonly referred to as a pebble heater. Pebble heaters are most typically applied in the high temperature hydrocarbon conversion field by contacting a moving contiguous mass of solid refractory contact material with hot gases in a first heat exchange step, and then utilizing the moving bed of heated refractory material as a heat transfer medium in a second heat transfer step to supply heat to fluids in direct contact therewith.

The term "pebble" as used herein refers to the small pebble-like, solid, refractory material comprising an element of the contact mass generally used in pebble heater apparatus. Pebbles so used, are preferably substantially spherical and relatively uniform in size, although in some instances they may be rod-shaped or irregular in size. Spheres of ⅛" to 1" in diameter function desirably, and those about ¼" to ½" are most practicable. Pebbles, as used herein, comprise any solid refractory material of flowable form, size and strength suitable for carrying heat for transfer to gases in contact therewith. Pebbles comprising beryllia, alumina, zirconia, mullite, and periclase, for example, make excellent contact material for most processes. Metal balls such as nickel, "Monel," and "Inconel," iron, etc. have utility in specific processes. Pebbles and/or pebble surfaces may be catalytically active, or inert, to gases in contact therewith, depending on the specific process.

Conventional pebble heater apparatus usually comprises a series of at least two chambers positioned vertically with respect to each other. The top and bottom chambers are referred to respectively as the pebble heating chamber and the gas contacting chamber or, preferably herein, the reaction chamber. A combustion chamber is positioned subjacent or in close proximity to the sides of the lower portion of the pebble heating chamber. Occasionally all of these zones are formed within one elongated chamber. Hot gases from the combustion chamber are injected into the pebble heating chamber and passed therein counter-currently in contact with the down flowing contiguous mass of pebbles. Hot gases so utilized, usually comprise combustion or flue gases produced in the combustion chamber, from substantially complete burning of a combustible gas. However, if desired, hot gases can be supplied to the pebble heater chamber from a source external to the pebble heater apparatus. Hot gas in contact with the pebble mass transfers heat thereto in a first heat transfer step. Effluent gas from the pebble heating chamber, having transferred heat to the pebbles, is relatively cool and is passed through the upper portion of the chamber for utilization elsewhere or to the stack. Pebbles thus heated in a first heat transfer step are passed downwardly from the pebble heating chamber through a conduit commonly called the pebble throat, to the reaction chamber and are therein contacted in countercurrent flow with upwardly flowing feed gases in a second heat transfer step. Effluent gas from the reaction chamber is passed from its top portion. Pebbles, relatively cool subsequent to the transfer of heat to the feed gas, are passed into the lower portion of the reaction chamber and discharged to a means, such as for example, an elevator, for recycling such discharged pebbles to the inlet of the pebble heating chamber.

Utilization of pebble heating apparatus is applicable and advantageous in various processes such as hydrocarbon conversion, gas absorption, and gas-solid heat exchange, in general. A principal use of pebble heater apparatus is in the conversion of hydrocarbons, involving thermal or catalytic processes such as cracking, hydrogenation, dehydrogenation, isomerization, polymerization, oxidation and the like. It is imperative, of course, in such a utilization of pebble heater apparatus, to effect controlled conditions of temperature and contact time between feed gases and the pebble heat transfer mass in the reaction chamber, in order to prevent overreacting or underreacting, with the accompanying excessive carbon formation or undesirable low conversion levels, as the particular case would be. It is equally imperative to effect controlled conditions of temperature and contact time in the pebble heating chamber between hot flue gases and pebbles to be heated, in order to prevent inefficient utilization of hot flue gases as a heat transfer medium, and to prevent uneven heating of the contact mass to be utilized in the second heat transfer step, in the subjacently positioned gas reaction chamber.

To effect such control of contact time between the pebble mass and gases, in both the pebble heating chamber and the gas reaction chamber, it is necessary to regulate the movement of pebbles throughout the chambers aforesaid to conform to a specific and usually constant rate depending upon the particular utilization of the pebble heater apparatus.

An object of this invention is to provide a means for regulating and maintaining a flow of contiguous solid particulate material through an apparatus.

Another object is to provide means for maintaining a desired rate of flow of pebbles through a pebble heater apparatus.

Another object is to provide a means for regulating the flow of pebbles through a pebble heater apparatus to conform to a specific flow rate.

Another object is to provide a pebble feeder apparatus to be employed in conjunction with a pebble heater apparatus to regulate the rate at which pebbles flow therethrough and to maintain a desired rate of such pebble flow.

Another object is to provide an apparatus for controlling the rate of heat transfer between pebbles and fluids in a pebble heater.

It is still another object of this invention to provide a pebble heater apparatus in which the rate of pebble circulation may be varied so as to maintain constant heat input, or reaction rate, in the conversion chamber.

Other objects will be apparent to one skilled in the art, from the accompanying discussion and disclosure.

In accordance with my invention, the movement of a contiguous mass of solid material through an apparatus is regulated, by a feeder device, to conform to a specific and constant rate and is maintained over prolonged periods of time at such a requisite level. With respect to pebble heater apparatus, the movement of the contiguous pebble mass through the chambers can be regulated to conform to a specific rate and can be maintained at such a rate for a prolonged duration.

The apparatus of my invention as applied to pebble heater apparatus, may be referred to as a "pebble feeder" because it regulates and maintains a rate thus selected at which pebbles flowing from the lower part of the gas reaction chamber, are fed to an external means, such as an elevator, for recycle to the pebble heating chamber. By such regulation and maintenance of pebble flow, the rate of pebble flow in the entire pebble heater apparatus is thereby controlled.

The pebble feeder device of my invention comprises a rotatable cylinder, hereinafter referred to as a feeder barrel, having a corrugate wall, an open top and a closed bottom, a pressure tight casing enclosing the feeder barrel, a pebble inlet conduit extending through the casing for admitting pebbles from a pebble heater chamber to the feeder barrel, shaft means for variably rotating and for supporting the feeder barrel and for regulating its axial position with respect to the pebble inlet conduit i. e., for moving the feeder barrel in an axial direction, and a pebble outlet in the casing for discharging pebbles which flow from the feeder barrel. The feeder barrel normally receives pebbles from the lower-most chamber of the pebble heater apparatus and when rotating discharges these pebbles at a uniform rate usually to an elevator for recycle to the top of the pebble heating chamber. The feeder barrel is obliquely positioned, and the pebble inlet conduit, extends into its open top, and terminates in spaced relation to the closed bottom to provide a minimum clearance of one pebble diameter, through which pebbles can be passed. The clearance between the end of the conduit and the closed bottom of the feeder barrel, and the rate of rotating the feeder barrel may be adjusted while the feeder cylinder is in operation. The end of the conduit, terminating in the feeder barrel, lies in a plane parallel to that of the interior bottom-surface of the barrel. The projection of the axis of the pebble inlet conduit should intersect the plane of the bottom of the feeder barrel, in the first lower quadrant numbered in the direction of rotation of the barrel.

The axial position of the feeder cylinder with respect to the end of the pebble inlet conduit, the rate of rotation of the feeder barrel, and the oblique angle at which the feeder barrel is positioned, all relate to the rate of pebble flow through the pebble heater apparatus.

When operating the feeder barrel in a given axial or longitudinal position with respect to the end of the pebble conduit, a clearance is determined through which pebbles can flow from a pebble chamber of the pebble heater through the pebble conduit to the feeder barrel. Upon initiating such a flow with the feeder barrel at rest i. e. in a non-rotating state, a static pebble bed is formed in the lower portion of the barrel. However, if the clearance between the end of the pebble inlet conduit and the bottom of the feeder barrel is adjusted to provide a sufficiently great space, and/or if the height of the wall of the feeder barrel is sufficiently limited, pebbles will flow continuously from the conduit, and overflow the feeder barrel even when the feeder barrel is at rest. The adjustment of the longitudinal position of the feeder barrel with respect to the end of the pebble conduit in relation to the height of the wall, to cause such pebble flow while the barrel is at rest, is usually not preferable, but such an adjustment is within the scope of the broadest aspects of my invention.

The entire pebble bed formed in the feeder barrel is either static, or the pebbles disposed towards the outer surface of the bed are flowing, depending on the contour of the pebble bed surface with respect to the angle of repose. The angle of repose is defined herein as the angle formed by the contour of the surface of a pebble mass at rest, with the horizontal, within which angle, the head of pebbles is insufficient to overcome friction and beyond which, the head of pebbles is sufficient to overcome pebble friction. Consequently when the angle of repose of a bed of pebbles is exceeded, those pebbles lying outside the angle, are moving. The angle of repose of a pebble mass, normally used in pebble heaters, lies in the range of 30–40°.

When the feeder barrel is at rest, its longitudinal position with respect to the end of the pebble conduit is adjusted to retain the pebble bed surface within the angle of repose, and thereby in a static state. When the feeder barrel is rotated, the angle formed by the pebble bed surface and the horizontal is caused to exceed the angle of repose, with the result that pebbles move and overflow the edge of the barrel, at a rate determined by the degree to which the angle of repose is exceeded, i. e. all pebbles in excess of the quantity required to form the static body of pebbles in the barrel, flow from the inclined and rotating feeder barrel, overflowing the edge of same. Pebbles thus overflowing the feeder barrel are discharged through the pebble outlet conduit in the casing, for return to the pebble heating chamber. The rate of pebble flow may be varied by, either, or a combination of both of the following: speed of rotation of the barrel, and the amount of clearance between the pebble inlet conduit and the bottom of the feeder barrel. For any given rotation speed, the flow may be adjusted over a given range by adjustment of the clearance, and similarly, for any given clearance, the pebble flow may be regulated over a given range, by adjusting the rotation rate of the feeder barrel.

The feeder barrel is axially positioned at an angle within the range of 15–60°, and the specific angle determines the particular adjustments of feeder barrel rotation rate, and of clearance between the bottom of the feeder cylinder and the end of the pebble conduit, that are required to effect a desired pebble flow. The adjustments above described can be effected independently of whether or not the pebble heater apparatus is in operation. Both, singly and in combination, these adjustments afford precise control of pebble flow through a pebble heater when operated in conjunction with my pebble feeder.

In the following discussion, one form of the apparatus of this invention will be specifically disclosed. It is to be understood that these figures are diagrammatic only, and may be altered in many respects by those skilled in the art and yet remain within the intended scope of my invention.

Referring now to the drawings, Figure 1 is an elevation, partly in section, of the pebble feeder barrel assembly and shows means for supporting, rotating, and axially moving the feeder barrel.

Figure 4 is a schematic showing of a conventional pebble heater apparatus in conjunction with the pebble feeder of this invention, and illustrates one embodiment in which my pebble feeder may be utilized for regulating the rate of pebble flow in pebble heater apparatus.

Figure 1:
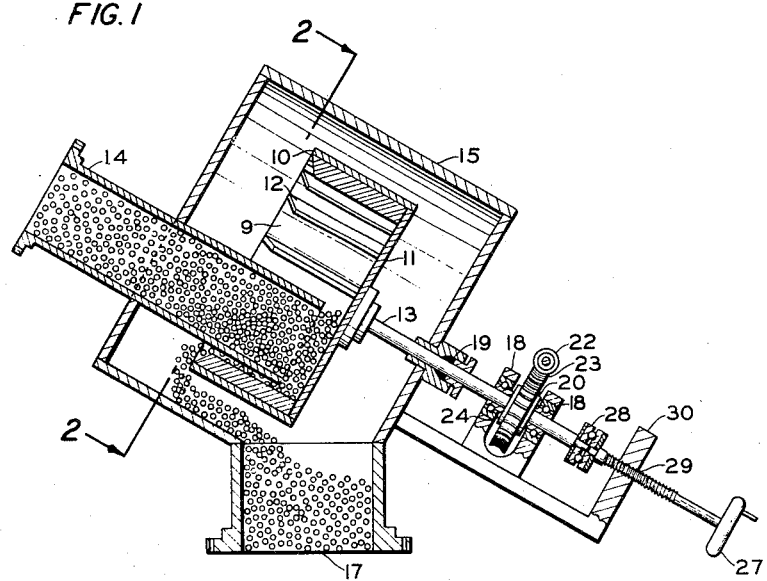
Figure 2:
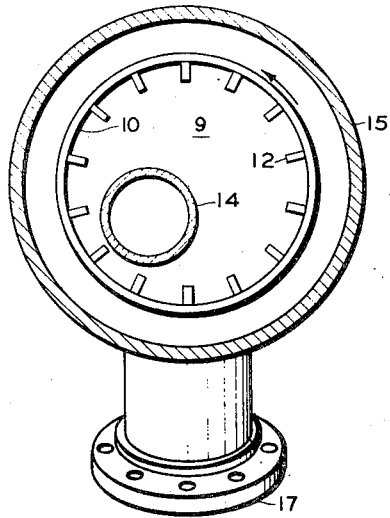
Figure 2 is a cross sectional view taken on line 2—2 of Figure 1, showing the feeder barrel and the pebble conduit extending thereinto.
Figure 3:
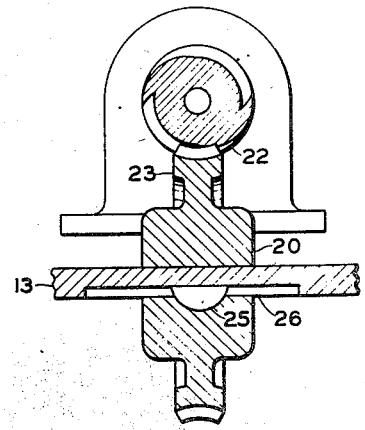
Figure 3 is a cross section of a preferred means for rotating the feeder barrel and shows that the shaft, which drives and supports the feeder barrel, can be moved axially.

Referring then to Figure 1, feeder barrel 10 is obliquely positioned, has open top 9, closed bottom 11, corrugate wall 12 and is rigidly attached to and supported by rotatable shaft 13. Pebble conduit 14 is in communication with pebbles in a pebble chamber such as chamber 39 of Figure 4, and extends through open top 9 toward a lower quadrant of the obliquely positioned feeder barrel. Preferably, the projected axis of conduit 14 intersects the bottom 11 of feeder barrrel 10, in the first lower quadrant numbered in the direction of rotation of the feeder barrel which in Figure 2, is the lower left hand quadrant. Conduit 14 is terminated within feeder barrel 10 preferably in a plane parallel to that of bottom 11, and in spaced relation thereto to provide a clearance through which pebbles from conduit 14 can be passed into feeder barrel 10. In the event that the axes of conduit 14 and feeder barrel 10 are not parallel, it is preferable to cut the end of conduit 14 in such a way as to maintain a parallel relationship between the end of the conduit and the bottom of the feeder barrel. The diameter of conduit 14 is usually less than ¾ of the diameter of feeder barrel 10, and preferably is within the range of ¼ to ½ the diameter of the barrel. Casing 15 encloses feeder barrel 10, and conduit 14 and support shaft 13 extend through the casing. Pebble outlet 17, of casing 15, is positioned so as to receive overflowing pebbles from cylinder 10, for discharge. Casing 15 is pressure tight within the range of operating pressure employed in conventional pebble heater apparatus usually within the limits of from 0.5 to 10 p. s. i. g. Shaft 13 is supported by bearings 18 and extends into casing 15 through packing gland 19, mounted integrally with the casing. Such a gland may be somewhat similar to a bushing, in that it comprises a steel rod which is drilled so as to permit a running fit on the shaft support 13. The packing gland is usually finned, so as to provide a means for dissipating heat, and thus to protect the packing, which is retained in the gland as a sealing means by the packing follower. Corrugate surface 12 comprises a plurality of radial vanes or ribs having a minimum height of 1 pebble diameter. The length of any rib is preferably that of the cylinder wall. However, if desired, a shorter length may be utilized. These ribs are preferably spaced at substantially equal intervals. Such intervals may preferably be in the range of from 3 to 10 pebble diameters. However, spacings outside such a range may be used as desired. Shaft 13 is rotated by rotating means 20, which is a high hub worm gear 23 of the type such that ends 24 wear against the two shaft bearings 18, and is attached on shaft 13 by key means 25 along keyway 26, shown in Figure 3. Keyway 26 is of sufficient length to permit shaft 13 to slide without movement of means 20. Worm gear 23 is engaged by worm 22, usually a part of a speed reducer (not shown). Rotating means 20 is usually powered by a drive means such as a steam turbine, or an electric motor. If a 1750 R. P. M. motor is used, the speed will be reduced by the speed reducer so that the shaft will be rotated at a speed usually less that 50 R. P. M. Shaft 13 axially attached exteriorly to feeder barrel 10, is moved longitudinally by adjusting means 27, which comprises a thrust bearing 28 and an adjusting screw 29, working through bracket 30, supported from casing 15. The axial adjustment of shaft 13 is sufficient to move feeder barrel 10 through a distance equal at least to the length of the wall of feeder barrel 10. Feeder barrel 10 is so positioned that the axis of the shaft is inclined to the horizontal at an angle usually within a range of 15 to 60°, more preferably about 20 to 40°. The minimum length of feeder barrel 10 i. e. the height of the barrel wall, is at least equal to the diameter of pebble inlet conduit 14.

Figure 4 is a schematic showing of a conventional pebble heater apparatus operating in conjunction with the pebble feeder of this invention, and shows one preferred embodiment of my invention, which is that applied to the regulation of the flow of pebbles in a pebble heater apparatus. Referring then to Figure 4, pebbles are passed into the upper portion of pebble heating chamber 30, through pebble inlet 29. The pebbles pass downwardly through chamber 30 and build up a contiguous pebble mass therein. Gaseous combustible materials, and air, or another oxygen-containing gas are charged either in admixture or separately through conduits 32 to combustion chamber 31, positioned subjacent chamber 30, and substantially completely burned therein. The combustion gases pass upwardly through openings 33 in perforate member 34, which separates pebble heating chamber 30 and combustion chamber 31. The hot combustion gases rise through the downwardly moving contiguous mass of pebbles in direct heat exchange therewith, heating the pebbles to a high temperature. The pebbles are normally heated to a temperature level in the range of 1400 to 3500° F., but lower or higher temperatures may be used as required by specific processes. As the combustion gas leaves the top of the pebble bed it is passed from chamber 30 through outlet conduits 35. The heated contiguous pebble mass moves from pebble heating chamber 30 downwardly through throat conduit 37 into reaction chamber 39, wherein it is brought into direct heat exchange relation with a fluid to be heated and/or reacted. For example, the heated pebbles may be used to supply heat to crack a light paraffinic mixture comprising ethane and propane so as to produce olefins, in which instance the temperature in the reaction chamber would be in the order of 1700–2000° F. Fluid charge material is fed through inlet conduit 40 to the pebble bed in chamber 39, rises through the reaction chamber, in heat exchange relation with the downwardly flowing pebbles, and passes from chamber 39 through effluent outlets 41. Relatively cool pebbles subsequent to the transfer of heat to the fluid charged to chamber 39, are passed from the bottom of chamber 39 through conduit 14 to feeder barrel 10 of the pebble feeder already described above in detail and illustrated by the elevation, partly in section, Figure 1 of the attached drawings. The feeder barrel and related parts of the pebble feeder in direct contact with pebbles are maintained, usually, at a temperature within the limits of 400–1200° F., depending upon the specific application of the pebble heater apparatus. Pebbles overflowing feeder barrel 10 are discharged from casing 15 through conduit means 17 to elevator 42 for return to pebble heating chamber 30.

The rate of pebble flow from conduit 14 to feeder barrel 10, and hence pebble flow rate through the entire pebble heater, is dependent upon the rate of rotation of the feeder barrel, and its axial position with respect to the end of conduit 14 each already discussed in detail above.

The pebble feeder provides a means of regulating the rate of heat input into the reaction zone, and therefore, provides a means for maintaining a constant temperature level in the reaction zone. The reaction rate, the conversion per pass, etc., may be maintained at predetermined levels or varied at will by adjusting the speed of rotation and the axial position of the inclined pebble feeder barrel.

As will be evident to those skilled in the art various modifications can be made or followed, in the light of the foregoing discussion and disclosure without departing from the spirit or scope of the disclosure or from the scope of the claims.

I claim:

1. A pebble feeder device for regulating the flow of pebbles in a pebble heater apparatus, comprising an obliquely positioned rotatable feeder barrel having an open top, a closed bottom, and a corrugate inner wall; a casing enclosing said feeder barrel; a conduit for admitting pebbles from said pebble heater to said feeder barrel; said conduit having a cross section smaller than that of said feeder barrel and extending through said casing into the open top of said barrel a spaced minimum distance of one pebble diameter from the bottom, said conduit so extending that its projected axis intersects the bottom of said feeder barrel in the first lower quadrant thereof numbered in its direction of rotation and so that the terminated end of said conduit lies in a plane parallel to said bottom; an exteriorly disposed rotatable shaft support for said barrel attached axially and rigidly to the bottom thereof and extending through said casing, means for adjustably rotating said shaft, means for adjustably moving said shaft in an axial direction, thereby providing means for altering the rate of rotation of said feeder barrel and the axial position of said feeder barrel with respect to said conduit so as to regulate the flow of pebbles in said pebble heater; and pebble outlet means in a lower portion of said casing for discharging pebbles overflowing said feeder barrel.

2. In an apparatus through which a contiguous particulate mass of solid material is moved, a feeder device for regulating the flow of such solid material therein, comprising an obliquely positioned rotatable feeder barrel having an open top, a corrugate inner wall and a closed bottom; means for supporting said feeder barrel; means for rotating said feeder barrel; a conduit for admitting solid material from such an apparatus to said feeder barrel, said conduit having a cross section sufficiently smaller than that of said feeder barrel and being so positioned that it terminates entirely within the first lower quadrant of said barrel numbered in its direction of rotation, said conduit extending into the open end of said barrel a spaced distance from the bottom thereof so as to permit said solid material to flow from said apparatus to the barrel and to overflow the barrel during rotation of same.

3. In an apparatus through which a contiguous particulate mass of solid material is moved, a feeder device for regulating the flow of such solid material therein, comprising an obliquely positioned rotatable feeder barrel having an open top, a corrugate inner wall and a closed bottom; means for supporting said feeder barrel, means for rotating said barrel; conduit means for admitting solid material from such an apparatus to said feeder barrel, said conduit having a cross section smaller than that of said feeder barrel and extending into the open top of said barrel a spaced distance from its bottom, thereby causing solid material to flow from said apparatus to said feeder barrel and to overflow same during rotation thereof; said conduit so extending that its projected axis intersects the bottom of said feeder barrel in the first lower quadrant thereof numbered in its direction of rotation and so that its terminated end lies in a plane parallel to said bottom; and means for axially moving said feeder barrel, thereby providing for moving said barrel longitudinally in relation to said inlet conduit so as to vary the flow of pebbles from said feeder barrel during rotation of same.

4. A pebble feeder device for regulating the flow of pebbles in a pebble heater apparatus, comprising a rotatable feeder barrel obliquely positioned at an angle with the horizontal within the limits of 15 to 60°, said barrel having a height equal at least to the diameter of a conduit described hereinbelow, an open top, a closed bottom, and a corrugate inner wall; a casing pressure tight in the range of ½ to 10 p. s. i. enclosing said barrel; a tubular conduit for admitting pebbles from said pebble heater to said feeder barrel, said conduit having a diameter within the range of 0.25 to 0.50 of that of said barrel and extending through said casing into the open top of said barrel a spaced minimum distance of one pebble diameter from the bottom, said conduit so extending that its projected axis intersects the bottom of said feeder barrel in the first lower quadrant thereof numbered in its direction of rotation and so that the terminated end of said conduit lies in a plane parallel to said bottom; an exteriorly disposed rotatable shaft support for said barrel attached axially and rigidly to the bottom thereof and extending through said casing, means for adjustably rotating and for adjustably moving said shaft in an axial direction, said shaft being adapted to be moved axially a distance equal at least to the height of said barrel, thereby providing for altering the axial position of said feeder barrel with respect to said conduit and for altering the rate of rotation of said barrel so as to regulate the rate of pebble flow in said pebble heater; and pebble outlet means in a lower portion of said casing for discharging pebbles overflowing said feeder barrel.

5. In a pebble heater apparatus through which a contiguous mass of pebbles is moved in a downwardly direction, a feeder device for regulating the flow of pebbles therein, comprising an obliquely positioned rotatable feeder barrel having an open top, a corrugate inner wall, and a closed bottom; means for supporting said barrel; means for rotating said barrel; a conduit for admitting pebbles from such an apparatus to said feeder barrel, said conduit having a cross section smaller than that of said feeder barrel and extending into the open end of said barrel a spaced distance from the bottom thereof not less than one pebble diameter, thereby causing pebbles to flow from said apparatus to said feeder barrel and to overflow same during rotation thereof; said conduit so extending that its projected axis intersects the bottom of said feeder barrel in a lower quadrant and so that its terminated end lies in a plane parallel to said bottom.

6. A pebble feeder device for regulating the flow of pebbles in a pebble heater apparatus, comprising an obliquely positioned rotatable feeder barrel having an open top, a closed bottom, and a corrugate inner wall; a conduit for admitting pebbles from said pebble heater to said feeder barrel, said conduit having a cross section smaller than that of said feeder barrel and extending into the open top of said barrel a spaced minimum distance of one pebble diameter from the bottom, said conduit so extending that its projected axis intersects the bottom of said feeder barrel in the first lower quadrant thereof numbered in its direction of rotation, and so that its terminated end lies in a plane parallel to said bottom; an exteriorly disposed rotatable shaft support for said barrel attached axially and rigidly to the bottom thereof, means for adjustably rotating said shaft, and means for adjustably moving said shaft in an axial direction, thereby providing means for altering the rate of rotation of said feeder barrel and the axial position of said feeder barrel with respect to said conduit so as to regulate the flow of pebbles in said pebble heater.

7. In an apparatus through which a contiguous particulate mass of solid material is moved, a feeder device for regulating the flow of such solid material therein, comprising an obliquely positioned rotatable feeder barrel having an open top, a corrugate inner wall and a closed bottom; means for supporting said barrel; means for rotating said barrel; means for moving said barrel in an axial direction; a conduit for admitting solid material from such an apparatus to said feeder barrel, said conduit having a cross section sufficiently smaller than that of said feeder barrel and being so positioned that its projected axis intersects the bottom of said feeder barrel in a lower quadrant, said conduit extending into the open end of said barrel a spaced distance from the bottom thereof so as to permit said solid material to flow from said apparatus to the barrel and to overflow the barrel during the rotation of same.

LOUIS J. WEBER.

REFERENCES CITED

The following references are of record in the file of this patent:

UNITED STATES PATENTS

| Number | Name | Date |
| --- | --- | --- |
| 1,560,800 | Hoberecht | Nov. 10, 1925 |
| 2,417,049 | Bailey et al. | Mar. 11, 1947 |

FOREIGN PATENTS

| Number | Country | Date |
| --- | --- | --- |
| 782,432 | France | June 4, 1945 |